(12) United States Patent
Onishi

(10) Patent No.: US 10,911,973 B2
(45) Date of Patent: Feb. 2, 2021

(54) INFORMATION NOTIFICATION DEVICE, INFORMATION NOTIFICATION METHOD, AND RECORDING MEDIUM HAVING PROGRAM RECORDED THEREON

(71) Applicant: NEC CORPORATION, Tokyo (JP)

(72) Inventor: Takeo Onishi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/463,558

(22) PCT Filed: Nov. 20, 2017

(86) PCT No.: PCT/JP2017/041585
§ 371 (c)(1),
(2) Date: May 23, 2019

(87) PCT Pub. No.: WO2018/097073
PCT Pub. Date: May 31, 2018

(65) Prior Publication Data
US 2019/0380055 A1  Dec. 12, 2019

(30) Foreign Application Priority Data
Nov. 24, 2016 (JP) .................. 2016-228176

(51) Int. Cl.
*H04L 12/26* (2006.01)
*H04W 24/10* (2009.01)
(Continued)

(52) U.S. Cl.
CPC .............. *H04W 24/10* (2013.01); *H04B 7/15* (2013.01); *H04W 28/06* (2013.01); *H04W 28/16* (2013.01)

(58) Field of Classification Search
None
See application file for complete search history.

(56) References Cited

U.S. PATENT DOCUMENTS

2010/0117898 A1* 5/2010 Wigren ................ G01S 19/46
  342/357.43
2013/0303155 A1* 11/2013 Da Silva ............. H04W 36/14
  455/423
(Continued)

FOREIGN PATENT DOCUMENTS

JP  2002-27534 A   1/2002
JP  2008-219656 A  9/2008
(Continued)

OTHER PUBLICATIONS

International Search Report for PCT/JP2017/041585 dated Feb. 20, 2018 (PCT/ISA/210).

(Continued)

*Primary Examiner* — Phirin Sam
(74) *Attorney, Agent, or Firm* — Sughrue Mion, PLLC

(57) ABSTRACT

An information notification device which transfers to a communication device a packet transmitted by a terminal to a relay device. The information notification device is provided with: a communication condition providing unit which provides the packet transmitted by the terminal with communication condition information concerning a communication condition between the terminal and the relay device; a data transmission unit which transmits the packet provided with the communication condition information to the communication device; and a supplementation unit which, in the absence of arrival of the packet from the terminal, implements a notification supplementation process for notifying the communication device of the communication condition information.

10 Claims, 11 Drawing Sheets

(51) Int. Cl.
*H04B 7/15* (2006.01)
*H04W 28/06* (2009.01)
*H04W 28/16* (2009.01)

(56) References Cited

U.S. PATENT DOCUMENTS

| | | | | |
|---|---|---|---|---|
| 2014/0004851 | A1* | 1/2014 | Fix | H04B 1/707 |
| | | | | 455/425 |
| 2015/0124726 | A1* | 5/2015 | Ni | H04L 5/0091 |
| | | | | 370/329 |
| 2015/0244429 | A1* | 8/2015 | Zhang | H04B 7/024 |
| | | | | 370/329 |
| 2015/0382265 | A1* | 12/2015 | Da Silva | H04W 24/08 |
| | | | | 455/423 |
| 2016/0037463 | A1* | 2/2016 | Siomina | H04W 52/383 |
| | | | | 370/330 |
| 2016/0128123 | A1* | 5/2016 | Li | H04B 7/026 |
| | | | | 370/252 |

FOREIGN PATENT DOCUMENTS

| | | |
|---|---|---|
| JP | 2008-312227 A | 12/2008 |
| JP | 2009-94877 A | 4/2009 |
| JP | 2010-74650 A | 4/2010 |
| WO | 2007/052571 A1 | 5/2007 |
| WO | 2008/041632 A1 | 4/2008 |

OTHER PUBLICATIONS

Written Opinion of the International Searching Authority for PCT/JP2017/041585 dated, Feb. 20, 2018 (PCT/ISA/237).
Ankur Jain et al., "Mobile Throughput Guidance Exposure Inband Signaling Protocol", Internet Engineering Task Force, Sep. 7, 2015, 10 pgs., <URL:https://tools.ietf.org/html/draft-flinck-mobile-throughput-guidance-03>.

* cited by examiner

Fig. 4

| OPTION NUMBER (1B) | NUMBER OF OPTION BYTES (1B) | OPTION VALUE (NUMBER OF OPTION BYTES −2B) |

Fig. 9

| OPTION NUMBER (1B) | NUMBER OF OPTION BYTES (1B) | IDENTIFIER (4B) | COMMUNICATION STATE (NUMBER OF OPTION BYTES −6B) |

INFORMATION NOTIFICATION DEVICE, INFORMATION NOTIFICATION METHOD, AND RECORDING MEDIUM HAVING PROGRAM RECORDED THEREON

CROSS REFERENCE TO RELATED APPLICATIONS

This application is a National Stage of International Application No. PCT/JP2017/041585 filed Nov. 20, 2017, claiming priority based on Japanese Patent Application No. 2016-228176, filed Nov. 24, 2016, the disclosures of which are incorporated herein in their entirety by reference.

TECHNICAL FIELD

The present invention relates to an information reporting device, an information reporting method and a program, and particularly, relates to an information reporting device, an information reporting method, and a program that report information indicating a communication state in a mobile communication network.

BACKGROUND ART

In an information processing terminal (hereinafter, referred to as a "terminal") such as a smartphone that uses a mobile communication network (hereinafter, referred to as a "mobile network"), when receiving intensity of a radio wave sent from a radio base station (hereinafter, referred to as a "base station") decreases, or a degree of congestion of the mobile network increases, then quality of experience (QoE) of an application such as a Web browser and a moving picture application, which uses communication, may be degraded.

In a server on the Internet, which transmits data to the application, or in a relay device that relays data transmitted from the server to the terminal, communication is appropriately controlled in response to communication quality between the terminal and the base station, whereby such degradation of the quality of experience can be prevented.

For example, NPL 1 describes a technology in which an edge device (or a mobile edge computing (MEC) device) disposed in a base station or in the vicinity of the base station embeds a communication throughput, which is sent from the base station to a terminal, in a transmission control protocol (TCP) packet transmitted from the terminal, and transmits the embedded communication throughput to a server.

In accordance with such a technology, the server can improve the quality of experience of the application by performing communication control corresponding to the reported communication throughput. For example, a server that transmits a moving picture sets a bit rate of the moving picture, which is to be transmitted, in response to the reported communication throughput. In this way, stop of reproduction of the moving picture owing to depletion of a reproduction buffer of a moving picture application can be prevented in the terminal, thus making it possible to improve the quality of experience. Moreover, in accordance with such a technology, the communication throughput is embedded in the TCP packet in the base station or the MEC device, and accordingly, it is never necessary to add any change to the terminal.

As a related art, PTL 1 describes a terminal that reports feedback information, and a base station that adaptively modulates/encodes or schedules transmission data on the basis of the reported feedback information, and transmits resultant data.

PTL 2 also describes a technology for inserting the number of client terminals which are connecting to access points and a throughput of a backhaul into a media access control (MAC) frame and reporting the number and the throughput to the client terminals, thereby connecting the client terminals to an access point with a high throughput.

Moreover, PTL 3 describes a technology for periodically transmitting, to a base station, quality information channel quality indicator (CQI) measured by a terminal on the basis of a propagation situation of a downlink, switching values relating to a modulation method, an encoding rate and the like to optimum values corresponding to the propagation situation on the basis of the quality information CQI received by the base station, calculating a receiving timing of the quality information CQI, and reporting the calculated receiving timing to an upper layer (a base station control device).

Furthermore, PTL 4 describes a technology for combining latest receiving state information and receiving state information at a previous reporting time point with each other, and reporting the receiving state from a receiving side to a transmitting side, thereby suppressing an increase of a volume of information related to feedback of the receiving state.

Moreover, PTL 5 describes a technology in which a relay device transfers, to a receiving device, a data packet transmitted from a transmitting device, and transfers, to the transmitting device, a feedback information packet received from the receiving device.

CITATION LIST

Patent Literature

[PTL 1] International Publication No. WO 2008/041632
[PTL 2] Japanese Unexamined Patent Application Publication No. 2010-074650
[PTL 3] Japanese Unexamined Patent Application Publication No. 2008-312227
[PTL 4] International Publication No. WO 2007/052571
[PTL 5] Japanese Unexamined Patent Application Publication No. 2009-094877

Non Patent Literature

[NPL 1] A. Jain, et al., "Mobile Throughput Guidance Inband Signaling Protocol", [online], Sep. 7, 2015, Internet Engineering Task Force, [searched on Oct. 29, 2016], Internet <URL:https://tools.ietf.org/html/draft-flinck-mobile-throughput-guidance-03>

SUMMARY OF INVENTION

Technical Problem

The entire disclosed contents of PTLs 1 to 5 and NPL 1 are incorporated herein by reference. The following analysis is made by the inventor of the present invention.

In accordance with the technology described in NPL 1, a communication state between a base station and a terminal is reported to a server, whereby quality of experience of an application can be enhanced. However, in accordance with such a technology, a communication situation between the base station and the terminal, which is required to improve the quality of experience, may not be able to be reported to the server at a necessary timing. Reasons for the above will be described below in detail.

In the technology described in NPL 1, the base station gives a communication throughput to a TCP header of a transmission control protocol (TCP) packet transmitted from the terminal to the server, whereby the communication state is reported to the server. Hence, when the TCP packet transmitted from the terminal to the server passes through the base station in a short cycle, the communication state can be reported to the server at a sufficiently short time interval. Meanwhile, when no TCP packet that passes through the base station is present, the communication state between the base station and the terminal cannot be transmitted to the server, and the server becomes incapable of performing communication control corresponding to the communication state between the base station and the terminal. Moreover, the fact that the communication control is disabled may degrade quality of experience (QoE) in the terminal.

When the communication quality between the terminal and the base station deteriorates, such a situation may occur where some packets transmitted from the terminal to the server are lost and the TCP packet does not pass through the base station. For example, in long term evolution (LTE) as one of mobile communication standards, lost packets are re-sent on a media access control (MAC) layer, and when the lost packets fail to be re-sent on the MAC layer, the lost packets are re-sent on a radio link control (RLC) layer. Hence, during a period while re-sending processing is performed, the TCP packet does not pass through the base station. At this time, the communication state cannot be reported from the base station to the server, and the server becomes incapable of performing the communication control corresponding to the communication state between the base station and the terminal. In this way, the quality of experience in the terminal may be degraded.

Note that the technologies described in PTLs 1 to 5 do not cope with such a problem.

Accordingly, it is a problem to suppress the degradation of the quality of experience in the terminal, when the communication state between the relay device such as the base station and the terminal deteriorates. It is an object of the present invention to provide an information reporting device, an information reporting method and a program, which contribute to solution of such a problem.

Solution to Problem

An information reporting device, according to a first aspect of the present invention, is a device that transfers, to a communication device, a packet transmitted to a relay device by a terminal. The information reporting device includes a communication state giving unit for giving communication state information related to a communication state between the terminal and the relay device to a packet transmitted by the terminal. Further, the information reporting device includes a data transfer unit for transmitting, to the communication device, a packet given the communication state information. Furthermore, the information reporting device includes a compensation unit for implementing report compensation processing for reporting the communication state information to the communication device when a packet does not arrive from the terminal.

An information reporting method, according to a second aspect of the present invention, is a method for an information reporting device that transfers, to a communication device, a packet transmitted to a relay device by a terminal. The information reporting method includes a step of giving communication state information related to a communication state between the terminal and the relay device to a packet transmitted by the terminal. Further, the information reporting method includes a step of transmitting, to the communication device, a packet given the communication state information. Furthermore, the information reporting method includes a step of implementing report compensation processing for reporting the communication state information to the communication device when a packet does not arrive from the terminal.

A program, according to a third aspect of the present invention, is a computer program for a computer provided in an information reporting device that transfers, to a communication device, a packet transmitted to a relay device by a terminal. The program causes the computer to execute processing of giving communication state information related to a communication state between the terminal and the relay device to a packet transmitted by the terminal. Further, the program causes the computer to execute processing of transmitting, to the communication device, a packet given the communication state information. Furthermore, the program causes the computer to execute processing of implementing report compensation processing for reporting the communication state information to the communication device when a packet does not arrive from the terminal. Note that the program may be provided as a program product recorded in a non-transitory computer readable storage medium.

Advantageous Effects of Invention

In accordance with the information reporting device, the information reporting method and the program according to the present invention, when the communication state between the relay device such as the base station and the terminal deteriorates, the degradation of the quality of experience in the terminal can be suppressed.

BRIEF DESCRIPTION OF DRAWINGS

FIG. 4 is a view illustrating a format of communication state information in the first example embodiment.

FIG. 9 is a view illustrating a format of communication state information in the second example embodiment.

EXAMPLE EMBODIMENT

Figure 1:
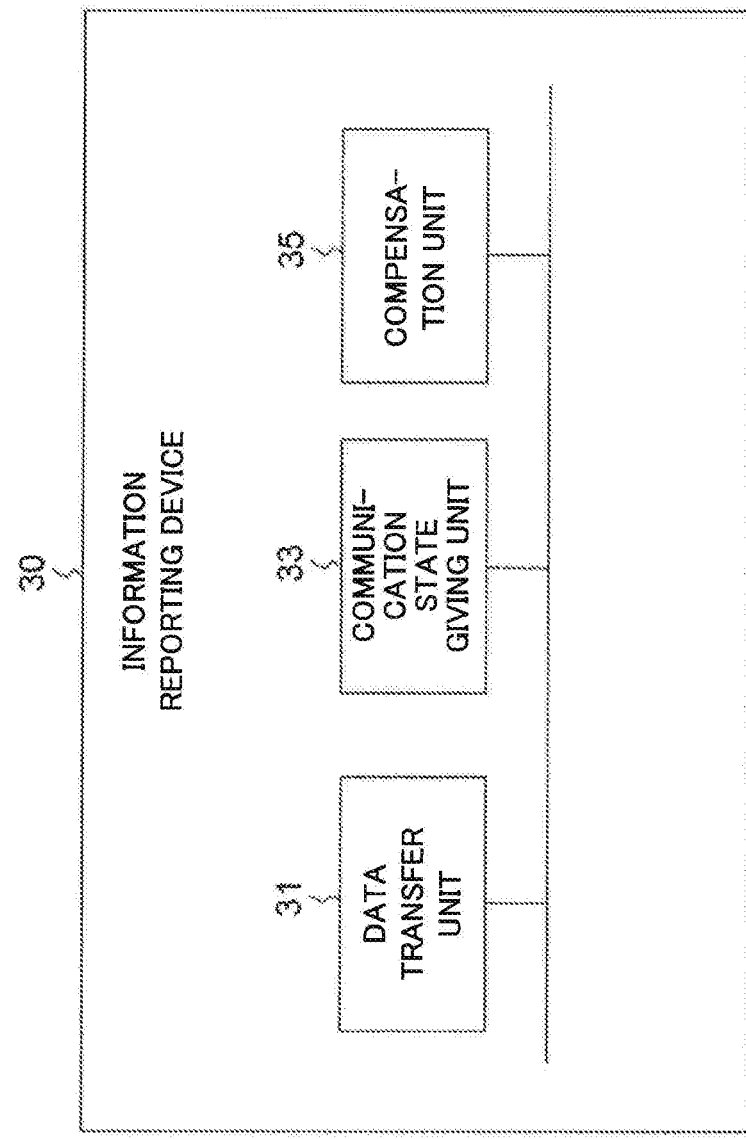
FIG. 1 is a block diagram illustrating a configuration of an information reporting device according to an example embodiment.

First, an overview of an example embodiment will be described. Note that reference numerals in the drawings, which are added to this overview, are illustrated as examples in order to solely assist the understanding, and do not intend to limit the present invention to illustrated aspects.

Figure 2:
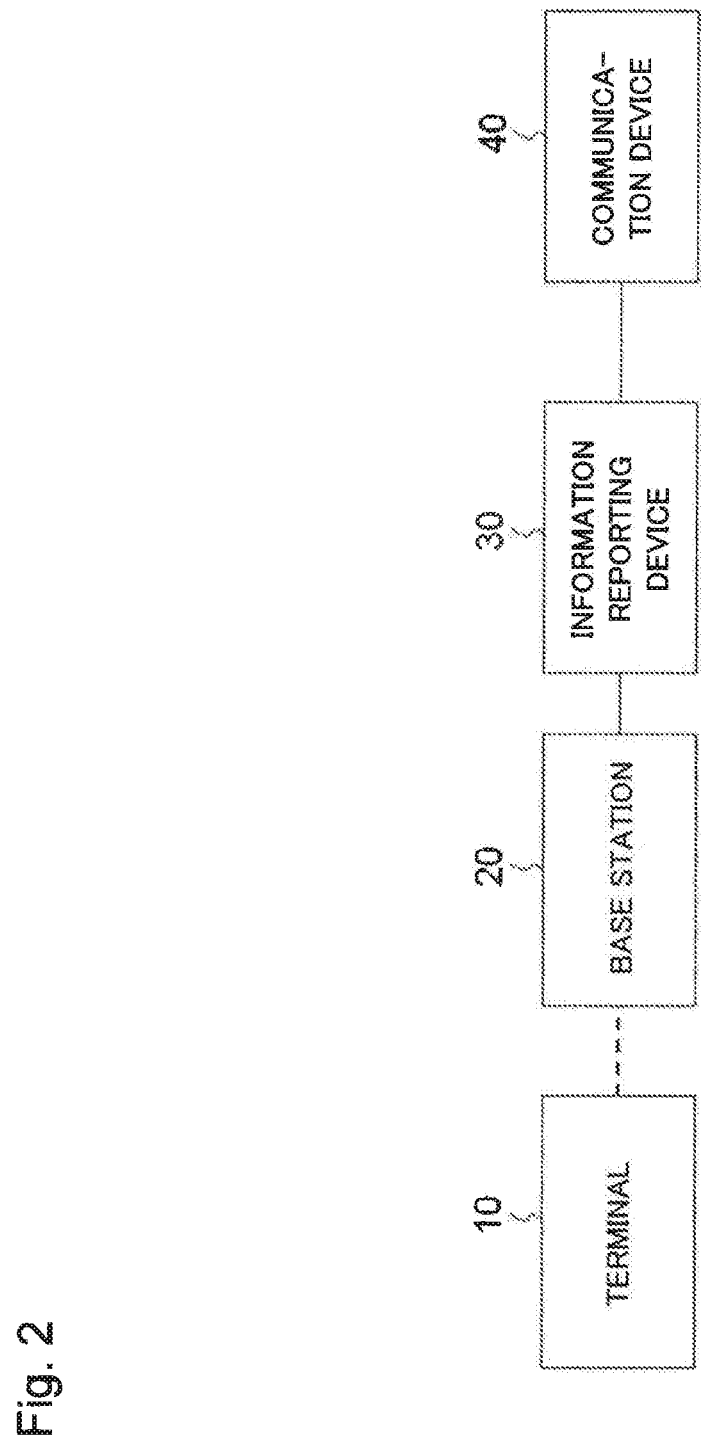
FIG. 2 is a block diagram illustrating a configuration of a communication system including the information reporting device according to a first example embodiment.
Figure 6:
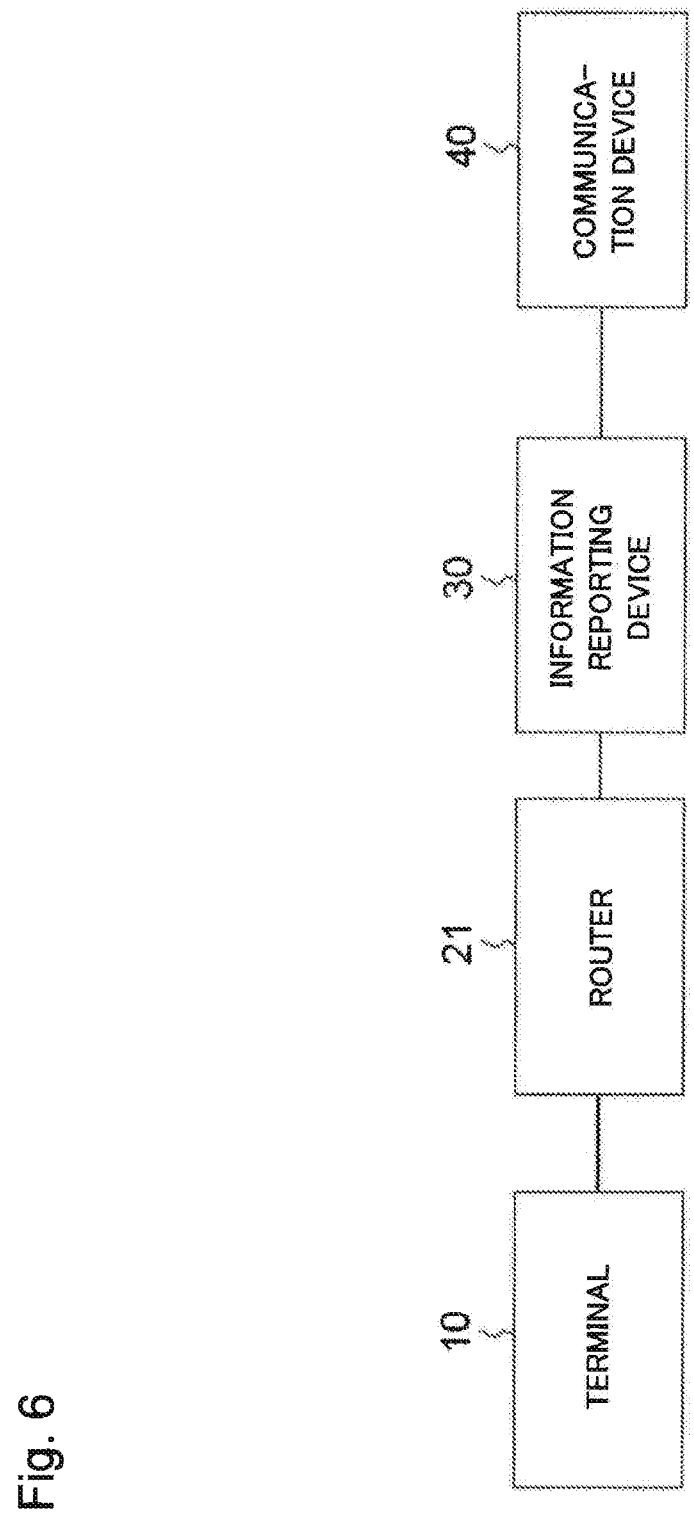
FIG. 6 is a block diagram illustrating a configuration of a communication system including an information reporting device according to a second modified example.

FIG. 1 is a block diagram illustrating a configuration of an information reporting device 30 according to an example embodiment. As illustrated in FIGS. 2 and 6, the information processing device 30 is a device that transfers, to a communication device 40, a packet transmitted to a relay device (for example, a base station 20 and a router 21) by a terminal 10. Referring to FIG. 1, the information reporting device 30 includes: a communication state giving unit 33 that gives communication state information, which is related to a communication state between the terminal 10 and the relay device (the base station 20, the router 21), to a packet transmitted by the terminal 10; a data transfer unit 31 that transmits the packet, which is given the communication state information, to the communication device 40; and a compensation unit 35 that implements report compensation processing for reporting the communication state information to the communication device 40 (for example, in response to a result of determination as to whether the report compensation processing is required) when the packet does not arrive from the terminal 10.

For example, when the information reporting device 30 cannot report the communication state information, which is related to the communication state between the relay device (the base station 20) and the terminal 10, for a fixed time, the information reporting device 30 implements report compensation processing for making it possible to implement such report (for example, processing for instructing the base station 20 or the router 21 to cause the terminal 10 to re-send the packet). In this way, the communication state information can be reported to the communication device 40 early, and the communication device 40 performs communication control on the basis of the communication state information, whereby communication quality in the terminal 10 can be suppressed from being degraded. Hence, in accordance with the example embodiment, it becomes possible to report the communication state to the communication device 40 such as a server no matter whether the communication state between the relay device (the base station 20, the router 21) and the terminal 10 is good. In other words, in accordance with the example embodiment, when the communication state between the relay device (the base station 20, the router 21) and the terminal 10 deteriorates, the quality of experience in the terminal 10 can be suppressed from being degraded.

First Example Embodiment

Next, an information reporting device according to a first example embodiment will be described in detail with reference to the drawings.
[Configuration]

FIG. 2 is a block diagram illustrating a configuration of a communication system including an information reporting device 30 in this example embodiment. As illustrated in FIG. 2, the communication system includes the terminal 10, the base station 20, the information reporting device 30, and the communication device 40. Note that, in the configuration illustrated in FIG. 2, the terminal 10 connected to the base station 20 and the communication device 40 that communicates with the information reporting device 30 are each single. However, each of the terminal 10 and the communication device 40 may be plural in number. Hereinafter, constituents of the communication system in FIG. 2 will be described in detail.

The terminal 10 communicates with the communication device 40 through the base station 20 and the information reporting device 30. For example, the terminal 10 is a smartphone, a personal computer (PC), or the like and acquires data, which are required for an operation of an application on the terminal 10, from the communication device 40.

The base station 20 wirelessly communicates with the terminal 10 by using a mobile communication standard such as a wideband code division multiple access (W-CDMA) and long term evolution (LTE), and relays communication between the terminal 10 and the communication device 40. Moreover, the base station 20 reports information (communication state information) related to a communication state with the terminal 10 to the information reporting device 30. The communication state information is, for example, a communication throughput from the base station 20 to the terminal 10. Note that the communication state information may include other information. For example, the communication state information may include received radio wave quality such as reference signal received power (RSRP) and a signal to interference plus noise ratio (SINR) of a radio wave in the terminal 10, the radio wave being transmitted from the base station 20. Moreover, the communication state information may include the number of terminals 10 which are communicating with the base station 20. Moreover, the communication state information may include information indicating a communication state between another base station 20 and the terminal 10.

The information reporting device 30 gives the communication state information, which is reported from the base station 20, to the packet to be transmitted from the terminal 10 to the communication device 40, thereby reporting the communication state information to the communication device 40. For example, the information reporting device 30 is disposed in the vicinity or inside of the base station 20. The information reporting device 30 may be, for example, a mobile edge computing (MEC) device, or may be implemented as a function of the base station 20.

The communication device 40 transmits data of an image, a moving picture and the like to the terminal 10. The communication device 40 may be, for example, an application server disposed on the Internet. Moreover, the communication device 40 may be a communication relay device such as a packet data network gateway (P-GW) disposed on a relay point between a mobile network and the Internet.

Figure 3:
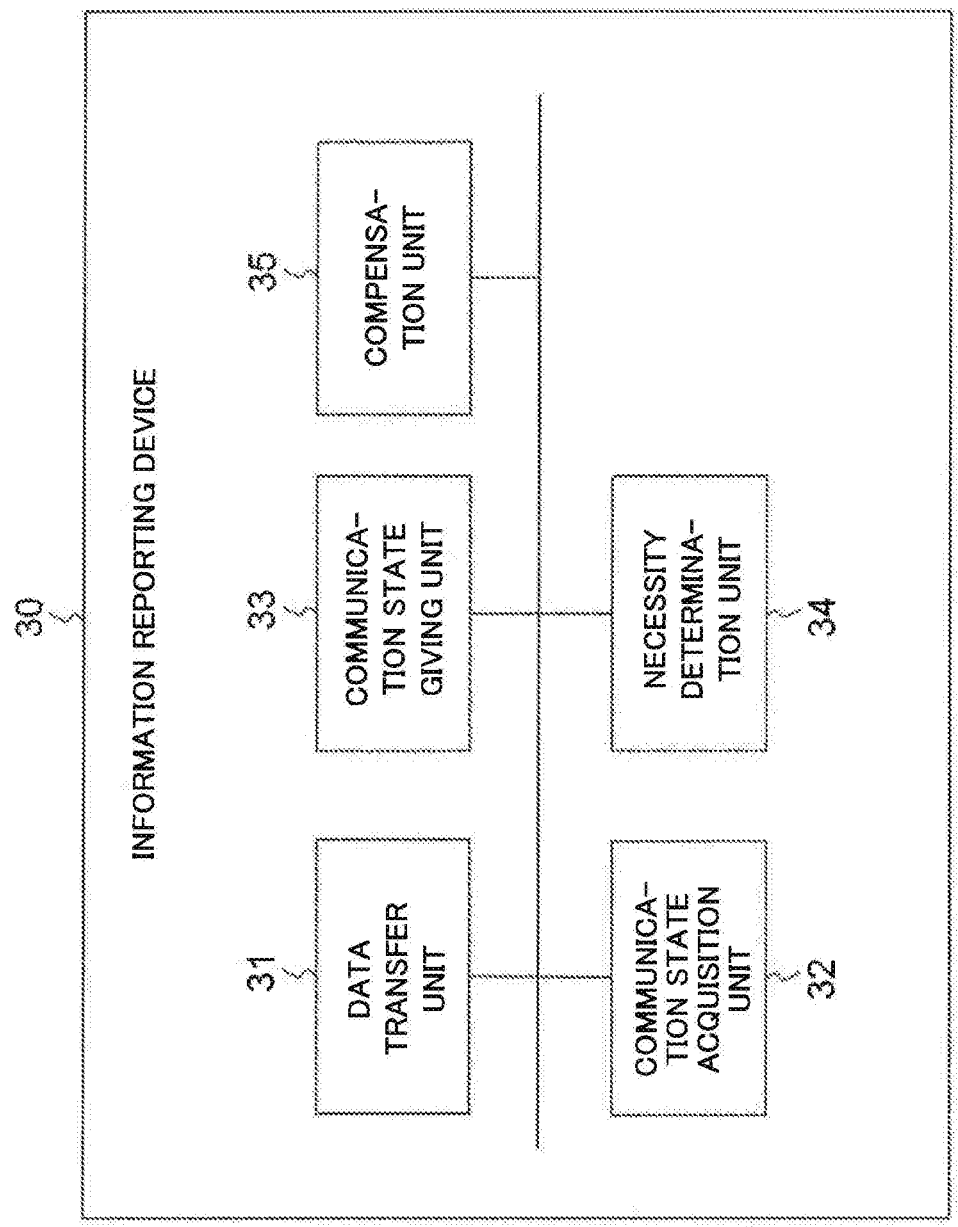
FIG. 3 is a block diagram illustrating a configuration of the information reporting device according to the first example embodiment.

FIG. 3 is a block diagram illustrating a configuration of the information reporting device 30. As illustrated in FIG. 3, the information reporting device 30 includes the data transfer unit 31, a communication state acquisition unit 32, the communication state giving unit 33, a necessity determination unit 34, and the compensation unit 35. Hereinafter, the individual constituents will be described later in detail.

The data transfer unit 31 transfers the communication packet exchanged between the base station 20 and the communication device 40. Note that, at the time of transferring the packet, the communication state giving unit 33 gives the communication state information, which is related to the communication state between the terminal 10 and the base station 20, to the packet transmitted by the terminal 10, and the data transfer unit 31 transfers the packet given the communication state information.

The communication state acquisition unit 32 acquires, from the base station 20, the communication state information related to the communication state between the terminal 10 and the base station 20. The communication state information includes, for example, information related to the communication throughput from the base station 20 to the terminal 10. Note that the communication throughput is merely an example, and the communication state information may be an index value such as the RSRP, the SINR and a channel quality indicator (CQI), which indicates, for example, receiving quality for a radio wave of the base station 20 in the terminal 10. Moreover, the communication state information may be the number of terminals 10 which have transmitted data within a fixed time. The communication state acquisition unit 32 may acquire the communication state from the base station 20, for example, on the basis of the representational state transfer (REST) method. Moreover, the base station 20 may be configured to report the communication state information to the communication state acquisition unit 32 of the information reporting device 30 periodically or when contents of the reported information change by a fixed amount or more. Note that the acquisition method of the communication state information, which is mentioned herein, is merely an example, and other methods may be used.

The communication state giving unit 33 gives communication state information, which is related to the terminal 10, to the packet transmitted from the terminal 10 via the base station 20. The data transfer unit 31 transmits the packet, which is given the communication state information, to the communication device 40, and reports the communication state information thereto. A destination to which the communication state giving unit 33 gives the communication state information is, for example, an option field of a transmission control protocol (TCP) header.

As illustrated in FIG. 4, the TCP option field is composed of an option number (1 byte), the number of option bytes (1 byte), and an option value (obtained by subtracting 2 bytes from a value described in the number of option bytes). The option number indicates a meaning of data to be entered in an option value. In this example embodiment, "30" is designated as the communication state information. The number of option bytes indicates the number of bytes of the TCP option illustrated in FIG. 4. A value corresponding to the option number is entered in the option value. In this example embodiment, for example, the communication throughput between the base station 20 and the terminal 10 is entered in the option value. Note that not only the communication throughput but also a plurality of values may be inserted into the option value. For example, the communication throughput may be written by 2 bytes, and the RSRP may be written by following 1 byte. In this way, plural types of the information related to the communication state between the base station 20 and the terminal 10 can be transmitted by one packet.

Note that the above description is merely an example, and a destination to which the communication state information is given may be, for example, an option field of an internet protocol (IP) header. When being given to the IP header, the communication state information can also be given to a packet according to protocol other than the TCP protocol, for example, a packet transmitted according to user datagram protocol (UDP). Moreover, the communication state information may be given to an extended header of a general packet radio service tunneling protocol (GTP) header. Using the GTP header, the communication state information can be given to the packet even when the option fields of the TCP header and the IP header are used up to upper limits of sizes thereof.

The necessity determination unit 34 determines whether it is necessary to perform the compensation processing for reporting the communication state information, which is related to the terminal 10, to the communication device 40. For example, when the communication state giving unit 33 and the data transfer unit 31 cannot report the communication state information to the communication device 40 for a predetermined time, the necessity determination unit 34 determines that it is necessary to perform the compensation processing. Specifically, the necessity determination unit 34 determines whether it is necessary to perform the compensation processing on the basis of an elapsed time after the communication state giving unit 33 gives the communication state information to a packet last or since the data transfer unit 31 transmits such the packet. For example, when the elapsed time is longer than a predetermined value, the necessity determination unit 34 may determine that it is necessary to implement the compensation processing. Moreover, for example, when a variation of the communication state information exceeds a predetermined value, the necessity determination unit 34 may determine that it is necessary to implement the compensation processing.

The compensation unit 35 performs the compensation processing for causing the communication state giving unit 33 and the data transfer unit 31 to report the communication state information, which is related to the terminal 10, to the communication device 40. The compensation processing is, for example, processing for instructing the base station 20 to cause the terminal 10 to re-send the packet.

For example, when a loss of data received from the terminal 10 is sensed in a radio link control (RLC) layer of the base station 20, a timer (a t-Reordering timer) operates in the base station 20. When such lost data do not arrive even when a time set by the timer has elapsed, the base station 20 reports, to the terminal 10, a Negative Acknowledgement (NACK) that the data have not arrived. The terminal 10 that has received the NACK re-sends the data designated in the NACK.

Hence, the data are not usually re-sent in a period shorter than a period designated by the t-Reordering timer. Moreover, since the RLC layer ensures an order of data, subsequent data will wait for the lost data to be re-sent. Hence, during the period designated by the t-Reordering timer, no packet transmitted from the base station 20 to a side of the communication device 40 is present, and the information reporting device 30 cannot transmit the communication state information. Accordingly, when the necessity determination unit 34 determines that the compensation processing should be implemented, the compensation unit 35 instructs the base station 20 to transmit the NACK to the terminal 10 from the base station 20. In this way, the data are re-sent from the terminal 10 early, and it becomes possible for the information reporting device 30 to transmit the communication state information earlier than when the communication state information is re-sent in a usual case.

Moreover, the compensation unit 35 may newly generate a packet, and the communication state giving unit 33 may give the communication state information to the packet generated by the compensation unit 35, and thereafter, the data transfer unit 31 may transmit such a packet to the communication device 40. In the TCP, it is possible to transmit a packet, which is loaded with empty data, as a keep alive (KA) packet. Accordingly, the compensation unit 35 acquires information, which is related to the packet transmitted from the terminal 10 to the communication device 40, from the data transfer unit 31, and newly generates a packet. Herein, the information related to the packet is, for example, an IP address and a port of the terminal 10, an IP address and a port of the communication device 40, and a sequence number of the TCP. The compensation unit 35 generates a TCP packet with a payload size of 0 in which these pieces of information related to the packet are made all identical. The communication state giving unit 33 gives the communication state information to the TCP packet generated by the compensation unit 35, and the data transfer unit 31 transmits the packet after being given the communication state, to the communication device 40.

In accordance with such a configuration, even when the terminal 10 starts handover and the terminal 10 discontinues the data transmission addressed to the communication device 40, and even when the radio wave quality of the terminal 10 suddenly degrades and the re-sent data do not arrive at the base station 20, the communication state information can be reported since the compensation unit 35 newly generates a packet.

[Operation]

Figure 5:
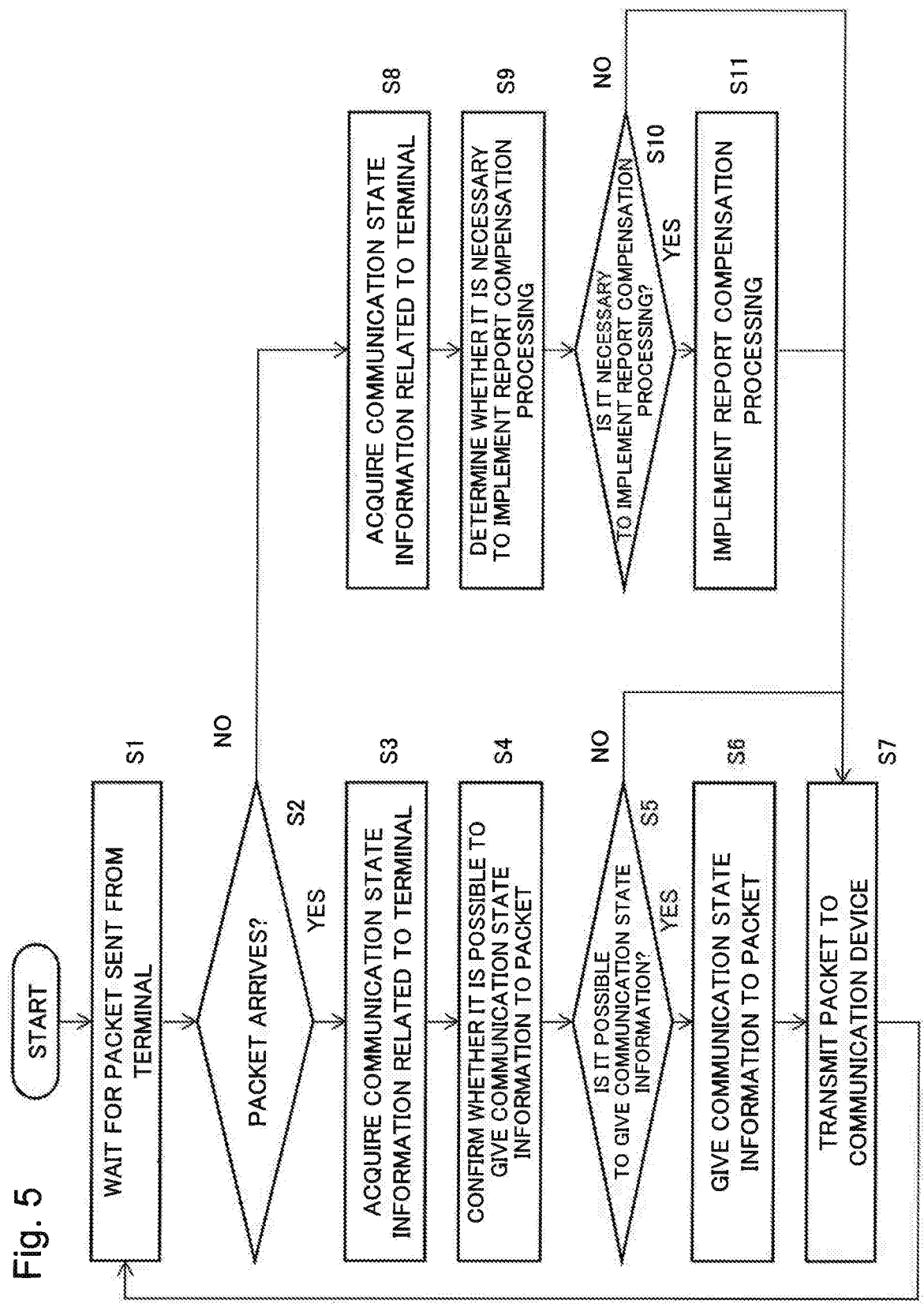
FIG. 5 is a flowchart illustrating an operation of the information reporting device according to the first example embodiment.

An operation of the information reporting device 30 according to this example embodiment will be described in detail with reference to a flowchart of FIG. 5.

First, the data transfer unit 31 of the information reporting device 30 waits for a packet, which is transmitted from the terminal 10 via the base station 20, for a predetermined time (Step S1). Here, as an example, the predetermined time is set to 100 milliseconds. However, a value of the predetermined time may be other values.

When receiving the packet from the terminal 10 within the predetermined time (Yes in Step S2), the information reporting device 30 executes usual information reporting processing. In other words, the information reporting device 30 executes the following Steps S3 to S7.

The communication state acquisition unit 32 acquires the communication state information related to the terminal 10 (Step S3). Herein, it is assumed that the communication state information acquired by the communication information acquisition unit 32 is the communication throughput from the base station 20 to the terminal 10. Moreover, it is assumed that, as an example, the communication throughput is "12 Mbps".

Next, the communication state giving unit 33 of the information reporting device 30 confirms whether it is possible to give the communication state information to the packet received in Step S1 (Step S4).

In this example embodiment, the communication state giving unit 33 gives the communication state information to a TCP header option of the packet. Hence, when the received packet is not the TCP protocol, or when information equivalent to 40 bytes which are an upper limit of a size of the TCP header option is already described in the TCP header option, it is determined that the communication state giving unit 33 cannot give the communication state information (No in Step S5). At this time, the data transfer unit 31 transmits a packet, which is not given the communication state information, to the communication device 40 (Step S7). Thereafter, the information reporting device 30 repeats the processing of Step S1 and the following steps.

Meanwhile, when it is determined that it is possible to give the communication state information to the packet (Yes in Step S5), the communication state giving unit 33 gives the communication state information to the packet transmitted by the terminal 10 (Step S6).

The data given to the packet are assumed to be "1E 04 2E E0" denoted by the hexadecimal notation in accordance with the format in FIG. 4. The first 1 byte means an option number of the TCP option, and is set to "30" in this example embodiment. The next 1 byte represents the size of the TCP option of the communication state information, and is set to "4" bytes in this example embodiment. The subsequent 2 bytes represent the communication throughput thereby, and are set to "12000" kbps. Note that, in this example embodiment, the communication throughput is written by 2 bytes while adopting kbps as a unit thereof; however, other units and byte lengths may be adopted.

Next, the data transfer unit 31 transmits the packet, which is given the communication state information by the communication state giving unit 33, to the communication device 40 (Step S7).

Thereafter, the information reporting device 30 returns the processing to Step S1, and thereafter, repeats the processing of Step S1 and the following steps.

Meanwhile, when the information reporting device 30 does not receive the packet from the terminal 10 within the predetermined time in Step S1 (No in Step S2), the information reporting device 30 cannot still report the communication state information to the communication device 40 during a fixed time. Accordingly, the information reporting device 30 implements processing for compensating a communication state report.

First, the communication state acquisition unit 32 acquires the communication state information related to the terminal 10 (Step S8). Herein, it is assumed that the communication state information acquired by the communication state acquisition unit 32 is the communication throughput from the base station 20 to the terminal 10, and the communication throughput is set to "12 Mbps" as an example.

Next, the necessity determination unit 34 determines whether there is required processing for compensating the transmission of the communication state information (Step S9). For example, on the basis of an elapsed time after the communication state giving unit 33 gives the communication state information to the packet last (Step S6), or after the data transfer unit 31 transmits such a packet (Step S7), the necessity determination unit 34 determines that it is necessary to implement the compensation processing when the elapsed time is longer than a predetermined value. In this way, it can be ensured that the communication state information is reported to the communication device 40 approximately at a predetermined time interval.

Meanwhile, for example, when the variation of the communication state information exceeds a predetermined value, the necessity determination unit 34 may determine that it is necessary to implement the compensation processing. For example, the necessity determination unit 34 may determine to implement the compensation processing when the variation of the communication throughput exceeds 10 Mbps. In this way, when the communication quality between the terminal 10 and the base station 20 changes greatly, the change of the communication quality is reported early to the communication device 40, and the communication device 40 performs communication control on the basis of the reported communication state report, whereby degradation of the communication quality can be suppressed.

Note that, the determination method described in this example embodiment is merely an example, and the necessity determination unit 34 may determine whether the compensation processing is required by other methods. For example, the necessity determination unit 34 may determine whether the compensation processing is required in response to the elapsed time after the communication state giving unit 33 gives the communication state information to the packet last (Step S6) or after the data transfer unit 31 transmits the packet given the communication state information (Step S7) and in response to whether the variation of the communication state information exceeds a predetermined value. Moreover, when the communication state does not change, the communication device 40 just needs to perform the control on the basis of the communication state information previously reported, and accordingly, it is not necessarily necessary to perform the compensation processing. In this way, the communication state report can be suppressed from being added.

When the necessity determination unit 34 determines in Step S9 to implement the compensation processing (Yes in Step S10), the compensation unit 35 executes processing for compensating the transmission of the communication state information (Step S11). For example, the compensation unit 35 may instruct the base station 20 to transmit the NACK of the RLC layer to the terminal 10 from the base station 20 in order to urge the terminal 10 to re-send the data.

Meanwhile, when the necessity determination unit 34 determines in Step S9 not to implement the compensation processing (No in Step S10), the data transfer unit 31 transmits the packet, which is not given the communication state information, to the communication device 40 (Step S7). The information reporting device 30 returns the processing to Step S1, and thereafter, repeats the processing of Step S1 and the following steps.

[Effects]

As described above, in accordance with this example embodiment, when the information reporting device cannot report the communication state information, which is related to the communication state between the base station and the terminal, for a fixed time, the report compensation processing is implemented to enable the report. In this way, it becomes possible to report the communication state information to the communication device early. Moreover, the communication device performs the communication control on the basis of the communication state information, whereby the communication quality in the terminal can be suppressed from being degraded.

First Modified Example

In this example embodiment, the description has been given of the example where the necessity determination unit 34 is present in the information reporting device 30; however, the necessity determination unit 34 may be provided in the communication device 40. Specifically, the necessity determination unit 34 may determine necessity of the report compensation processing for the communication state information in the communication device 40, and may request the report compensation processing to the information reporting device 30. In this way, it becomes possible to implement the compensation processing more accurately in response to logic of the communication control. For example, it is not necessary to perform the communication control after the communication device 40 finishes transmitting the packet to be transmitted to the terminal 10. At this time, the necessity determination unit 34 provided in the communication device 40 can determine that the compensation processing is unnecessary even when the communication state information does not arrive for a fixed time. In this way, an increase of loads on the information reporting device 30 and the base station 20 can be suppressed.

Second Modified Example

Moreover, in this example embodiment, the description has been given on the premise that the information reporting device 30 reports the communication state between the terminal 10 and the base station 20; however, the communication state may be of others. For example, as illustrated in FIG. 6, when the terminal 10 is connected by wire to the relay device such as the router 21, the information reporting device 30 may report a communication state between the terminal 10 and the relay device (for example, the router 21). In this way, the communication device 40 becomes capable of appropriately implementing the communication control not only in the wireless connection illustrated in FIG. 2 but also in a variety of communication environments.

Second Example Embodiment

Next, an information reporting device according to a second example embodiment will be described.

In the first example embodiment, when the communication state information cannot be reported though it is necessary to report the same, the terminal is urged to re-send the data, and so on, whereby the state where it becomes possible to report the communication state information early is generated. Meanwhile, in this example embodiment, the communication state information is transmitted by using a packet transmitted by another terminal. In this way, it becomes possible to transmit the communication state information earlier than in the case of urging the terminal to re-send the data. Moreover, a load on the network can be suppressed in comparison with the case where the information reporting device newly generates a packet and transmits the communication state information.

[Configuration]

Figure 7:
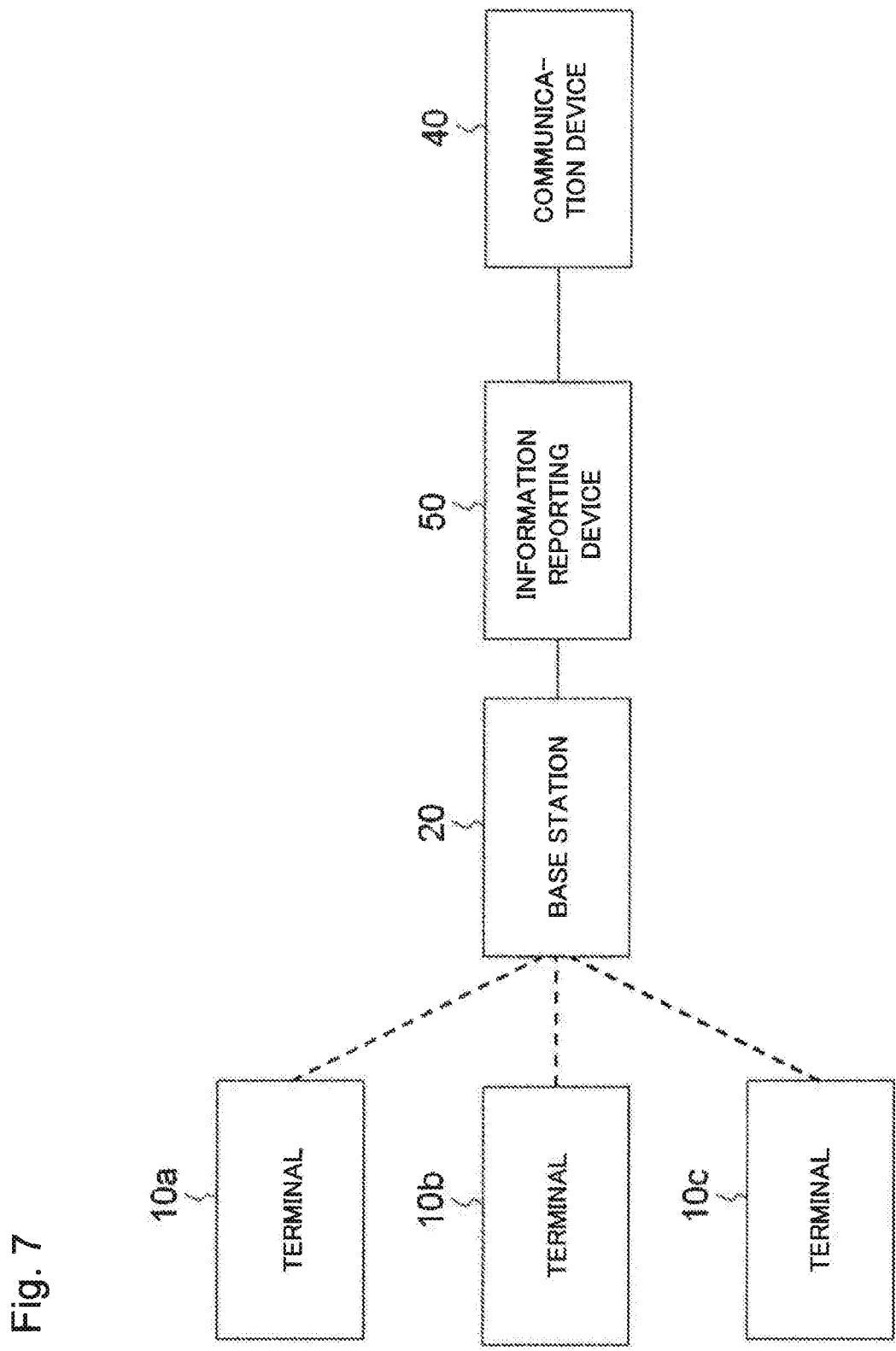
FIG. 7 is a block diagram illustrating a configuration of a communication system including an information reporting device according to a second example embodiment.

A configuration of a communication system including the information reporting device according to this example embodiment will be described in detail with reference to FIG. 7. As illustrated in FIG. 7, the communication system includes terminals 10*a* to 10*c* (hereinafter, the terminals 10*a* to 10*c* will be collectively referred to as "terminals 10"), a base station 20, an information reporting device 50, and a communication device 40. The communication system illustrated in FIG. 7 is different from the communication system illustrated in FIG. 2 in that the information reporting device 50 is provided in place of the information reporting device 30. Moreover, it is assumed that at least two or more terminals 10 which communicate with the base station 20 are present. In this example embodiment, as an example, a case where the terminals 10 which communicate with the base station 20 are composed of three terminals 10*a* to 10*c* will be described. However, the number of terminals 10 is not limited to this. Note that, when the number of terminals 10 which communicate with the base station 20 is one, the information reporting device 50 may perform the same processing as that in the information reporting device 30 according to the first example embodiment. In this way, the information reporting device 50 becomes capable of transmitting the communication state report at an appropriate timing under more various situations than in the first example embodiment.

Figure 8:
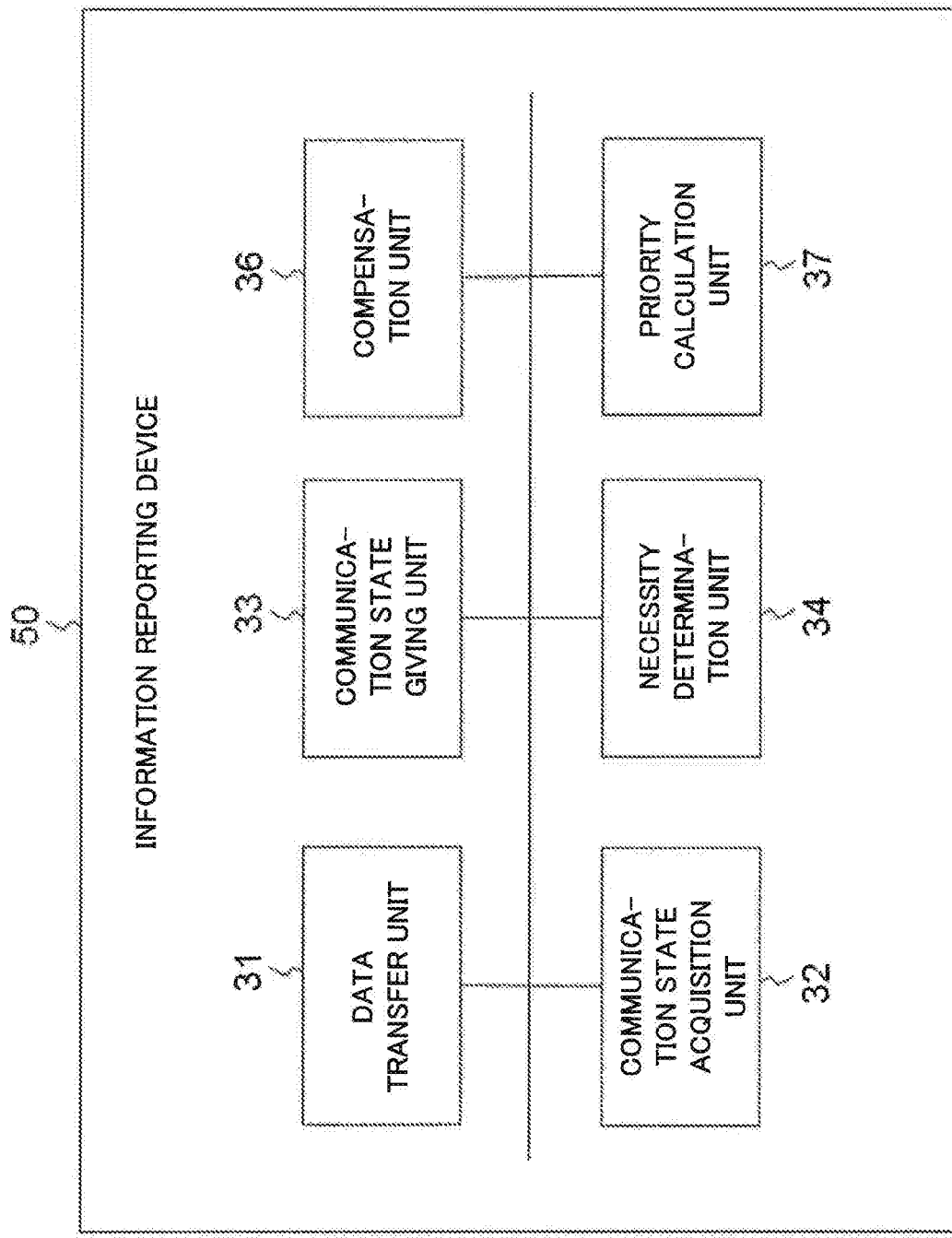
FIG. 8 is a block diagram illustrating a configuration of the information reporting device according to the second example embodiment.

Next, a configuration of the information reporting device 50 according to this example embodiment will be described in detail with reference to FIG. 8. As illustrated in FIG. 8, the information reporting device 50 according to this example embodiment includes a data transfer unit 31, a communication state acquisition unit 32, a communication state giving unit 33, a necessity determination unit 34, a compensation unit 36, and a priority calculation unit 37.

The information reporting device 50 according to this example embodiment is different from the information reporting device 30 (FIG. 3) according to the first example embodiment in that the priority calculation unit 37 is provided in the information reporting device 50. Moreover, in this example embodiment, an operation of the compensation unit 36 is different from the operation of the compensation unit 35 (FIG. 3) in the first example embodiment. Note that, in the following description, the same or similar reference numerals are assigned to the same constituents as or similar constituents to those in the first example embodiment, and a detailed description thereof is omitted. Hereinafter, a configuration of the information reporting device 50 according to this example embodiment will be described.

The priority calculation unit 37 calculates a priority for reporting communication state information, which is related to the plurality of terminals 10 connected to the base station 20, to the communication device 40. For example, when the terminals 10a to 10c connect to the base station 20, and the necessity determination unit 34 determines that compensation processing for the terminals 10b and 10c is required, then the priority calculation unit 37 calculates a priority of the communication state information related to the terminals 10b and 10c. The priority calculation unit 37 determines the priority, for example, in response to a variation of the communication state information. In the case of using a communication throughput as the communication state information, the priority calculation unit 37 calculates a variation between a communication throughput of communication state information previously transmitted to the communication device 40 and a current communication throughput. For example, when the current communication throughput of the terminal 10b is 12 Mbps, and the previously reported communication throughput thereof is 8 Mbps, the priority calculation unit 37 calculates the priority as: 12−8=4. Moreover, when the current communication throughput of the terminal 10c is 5 Mbps, and the previously reported communication throughput thereof is 30 Mbps, the priority calculation unit 37 calculates the priority as: 30−5=25. Here, as an example, a larger numerical value of the priority indicates a higher priority. Incidentally, the case where the variation is large affects the communication control of the communication device 40 more greatly, and accordingly, the degradation of the communication quality can be suppressed by giving a higher priority to the terminal with a large variation.

The compensation unit 36 implements the report compensation processing in response to a calculation result of a determination result of the necessity determination unit 34 and of the priority by the priority calculation unit 37. When the necessity determination unit 34 determines that the report compensation processing for the communication state information is required with regard to the terminal 10b, and the priority calculation unit 37 determines that the priority of the terminal 10b is higher than the priority of the terminal 10a, the compensation unit 36 performs the report compensation processing, and gives communication state information, which is related to the terminal 10b, to the packet transmitted by the terminal 10a. In this way, even when the packet transmitted from the terminal 10b does not arrive at the information reporting device 50, the communication state information related to the terminal 10b can be reported to the communication device 40.

In this example embodiment, in place of the format in FIG. 4, for example, the compensation unit 36 uses a format in FIG. 9 as the communication state information given to the TCP header. Referring to FIG. 9, the communication state information includes a TCP option number, the number of TCP option bytes, an identifier of the terminal 10, and a communication state related to the terminal 10 designated by the identifier. The identifier of the terminal 10 just needs to be an identifier by which it is possible to uniquely identify the terminal 10, and for example, may be an IP address of the terminal 10.

The communication device 40 that has received the communication state report confirms the identifier, and can thereby identify to which terminal 10 the transmitted communication state information is related. Moreover, when no identifier is present in the communication state information, the communication device 40 refers to an IP address of a transmission source of the packet, and can thereby identify to which terminal 10 the communication state information is related. As described above, the identifier of the terminal 10 is given only to the communication state information given by the compensation unit 36, and can thereby suppress an increase of an amount of data to be transmitted in comparison with the case of giving such identifiers to all pieces of the communication state information.

[Operation]

Figure 10:
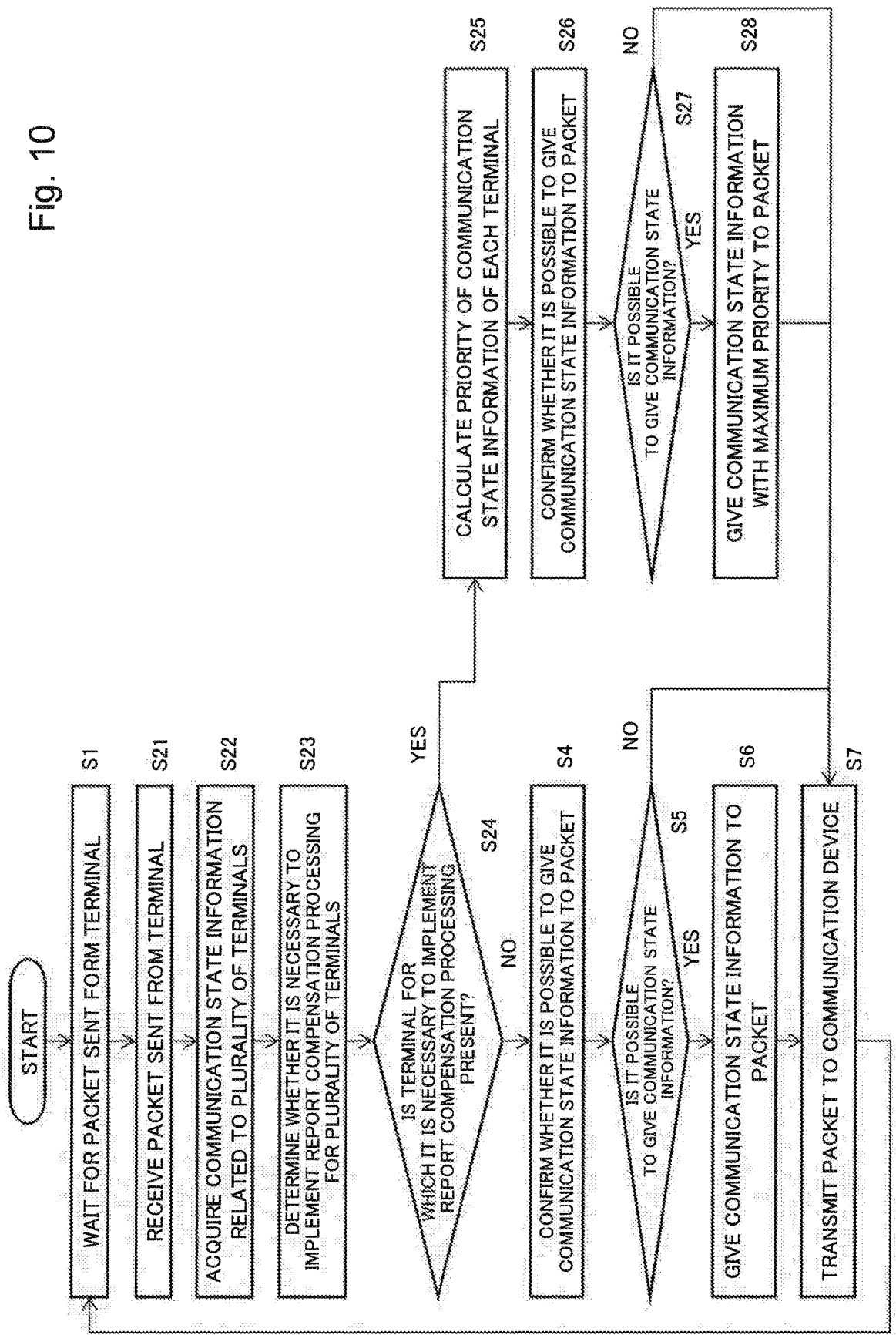
FIG. 10 is a flowchart illustrating an operation of the information reporting device according to the second example embodiment.

Next, an operation of the information reporting device 50 according to this example embodiment will be described in detail with reference to FIG. 10. Note that the same reference numerals are assigned to the same pieces of processing as those of the information reporting device 30 according to the first example embodiment, and a detailed description thereof is omitted.

First, the data transfer unit 31 waits for the packet sent from the terminal (Step S1).

Next, the data transfer unit 31 receives the packet sent from the terminal 10 (Step S21). Here, a transmission source of the received packet is defined as the terminal 10a.

From the base station 20, the communication state acquisition unit 32 acquires the communication state information related to all the terminals 10 connected to the base station 20 (Step S22). In this example embodiment, it is assumed that the terminals 10a to 10c connect to the base station 20. In other words, in Step S22, the communication state acquisition unit 32 acquires the communication state information related to the terminals 10a to 10c. Note that the example illustrated here is merely an example, and the number of terminals 10 to be connected to the base station 20 is not limited to three.

Next, on the basis of the communication state information received in Step S22, the necessity determination unit 34 determines whether it is necessary to implement the processing for compensating the communication state report with regard to each of the terminals 10 (Step S23).

When no terminal 10 in which it is determined to be necessary to compensate the communication state report in Step S23 is present (No in Step S24), the information reporting device 50 reports communication state, which is related to the terminal 10a as a transmission source of the packet, to the communication device 40. Processing in Steps S4 to S7 which follow is similar to the processing (Steps S4 to S7 in FIG. 5) of the information reporting device 30 in the first example embodiment, and accordingly, a description thereof is omitted.

Meanwhile, when the terminal 10 in which it is determined to be necessary to compensate the communication state report in Step S23 is present (Yes in Step S24), the information reporting device 50 implements the compensation processing of the communication state report for any of the terminals 10. Here, as an example, it is assumed that the necessity determination unit 34 determines that the compensation processing for the terminals 10*b* and 10*c* is required.

Next, the priority calculation unit 37 calculates the priority of the communication state information for the terminals 10*b* and 10*c* determined to need the compensation processing by the necessity determination unit 34 in Step S23 (Step S25). Here, the priority for the terminal 10*b* and the priority for the terminal 10*c*, each priority being calculated by the priority calculation unit 37, are set to 4 and 25, respectively.

Next, on the basis of the priority calculated by the priority calculation unit 37, the compensation unit 36 performs the processing for compensating the report of the communication state information. First, the compensation unit 36 determines whether it is possible to give the communication state information to the packet (Step S26).

Herein, it is assumed that, as the communication state information, information having the format in FIG. 9 is given to the packet. Herein, it is assumed that the communication throughput is used as the communication state, and that the communication state is represented by 2 bytes. In accordance with the configuration illustrated in FIG. 9, the information given in this example embodiment is composed of a TCP option number (1 byte), the number of option bytes (1 byte), an identifier of the terminal (4 bytes), and the communication state (2 bytes), and has totally 8 bytes. Note that an upper limit of the number of bytes of the TCP option is 40 bytes. Hence, in the case of inserting the communication state information into the option field of the TCP header, the compensation unit 36 determines whether the sum of the number of already used TCP option bytes of the packet received in Step S1 and the number of bytes (8 bytes) of the communication state information to be given exceeds 40 bytes.

In the case of determining that the number of the TCP option bytes does not exceed 40 bytes (i.e., it is possible to give the communication state information) (Yes in Step S27), the compensation unit 36 gives communication state information, which is related to the terminal 10*c* with the highest priority, to the TCP header of the packet that is transmitted from the terminal 10*a* and received in Step S1 (Step S28).

Next, the data transfer unit 31 transmits the packet to the communication device 40 (Step S7).

Note that, after Step S28, the compensation unit 36 may determine whether it is possible to give the communication state information, which is related to the terminal 10*b* with a next highest priority, to the packet, and may give the communication state information thereto when it is possible to give the same. In this way, the communication state information related to the plurality of terminals 10*b* and 10*c* can be transmitted by one packet.

Moreover, the description has been given of the example of not giving the communication state information, which is related to the terminal 10*a* as a transmission source of the packet, in the processing of Step S25 and the following steps in this example embodiment. However, after giving the communication state information related to the terminal 10*a* first, the communication state information related to the other terminal 10*c* may be given to the packet. In this way, it becomes possible to report the communication state information related to the other terminal 10*c* without hindering the report of the communication state information related to the terminal 10*a* as a transmission source of the packet.

Meanwhile, in the case of determining that the number of TCP option bytes exceeds 40 bytes in Step S26 (i.e., it is impossible to give the communication state information) (No in Step S27), the compensation unit 36 does not give the communication state information to the packet, and the data transfer unit 31 transmits the packet to the communication device 40 (Step S7).

[Effects]

As described above, in accordance with this example embodiment, the communication state information related to the terminals 10 (for example, the terminals 10*b* and 10*c*) is transmitted to the communication device 40 by using the packet transmitted by the other terminal 10 (for example, the terminal 10*a*). In this way, even when the packet sent from the terminal 10 does not arrive at the information reporting device, the communication state information is transmitted by using the packet of the other terminal 10, and accordingly, it becomes possible to transmit the communication state information early. Moreover, the load on the network can be suppressed in comparison with the case where the information reporting device newly generates a packet and transmits the communication state information.

Third Modified Example

In the second example embodiment, the description has been given of the example of giving, to the packet transmitted from the terminal 10, the communication state information, which is related to the other terminal 10, and reporting the communication state information to the communication device 40; however, it is not necessarily necessary to use the packet transmitted from the terminal 10. For example, as in the information reporting device in the first example embodiment, the communication state information related to the plurality of terminals 10 may be given to the packet generated by the information reporting device 30 itself. In this way, even when the packets sent from all the terminals 10 connected to the base station 20 do not arrive, the communication state information can be transmitted to the communication device 40 at an arbitrary time. Moreover, since the communication state information related to the plurality of terminals 10 is transmitted by one packet, and accordingly, the load applied to the network can be suppressed.

Fourth Modified Example

Figure 11:
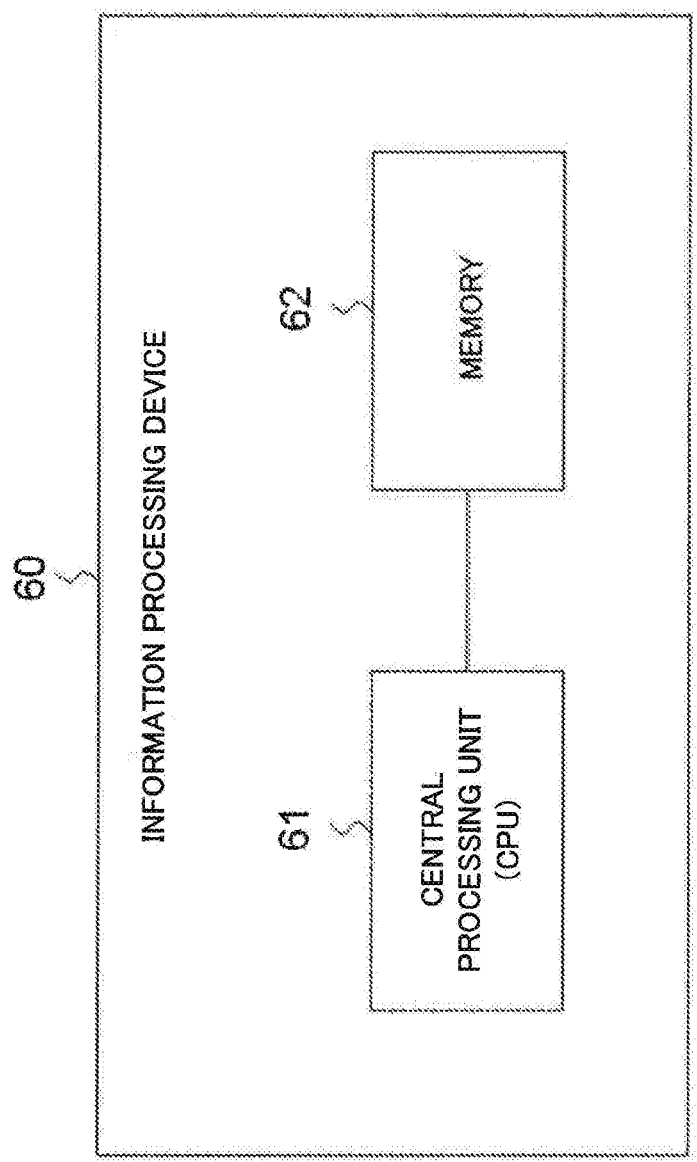
FIG. 11 is a block diagram illustrating a configuration of an information processing device.

Each of the information reporting device 30 (FIG. 3) according to the first example embodiment and the information reporting device 50 (FIG. 8) according to the second example embodiment may include an information processing device 60 illustrated in FIG. 11. The information processing device 60 includes a central processing unit (CPU) 61 and a memory 62. The CPU 61 executes a program stored in the memory 62, whereby the information processing device 60 may achieve a part or all of functions of the data transfer unit 31, the communication state acquisition unit 32, the communication state giving unit 33, the necessity determination unit 34, the compensation unit 35 (or 36) and the priority calculation unit 37 (FIG. 3, FIG. 8), which are provided in the information reporting device 30 (or 50).

The whole or part of the example embodiments disclosed above can be described as, but not limited to, the following supplementary notes.

[Supplementary Note 1]

An information reporting device that transfers, to a communication device, a packet transmitted to a relay device by a terminal, comprising:

a communication state giving unit for giving communication state information related to a communication state between the terminal and the relay device to a packet transmitted by the terminal;

a data transfer unit for transmitting, to the communication device, a packet given the communication state information; and a compensation unit for implementing report compensation processing for reporting the communication state information to the communication device when a packet does not arrive from the terminal.

[Supplementary Note 2]

The information reporting device according to Supplementary Note 1, further comprising:

a necessity determination unit for determining whether to implement the report compensation processing when the packet does not arrive from the terminal, wherein the compensation unit implements the report compensation processing, based on a result of the determination.

[Supplementary Note 3]

The information reporting device according to Supplementary Note 2, wherein the necessity determination unit determines whether to implement the report compensation processing, based on an elapsed time after the communication state giving unit transmits the communication state information.

[Supplementary Note 4]

The information reporting device according to Supplementary Note 2, wherein the necessity determination unit determines whether to implement the report compensation processing, based on a difference between a communication state when the communication state giving unit transmits the communication state information and a communication state after transmission.

[Supplementary Note 5]

The information reporting device according to Supplementary Note 2, wherein the compensation unit implements the report compensation processing, based on a determination result as to whether to implement the report compensation processing, the determination result being received from the communication device.

[Supplementary Note 6]

The information reporting device according to any one of Supplementary Notes 1 to 5, wherein the compensation unit instructs the relay device to cause the terminal to implement packet re-sending processing, as the report compensation processing.

[Supplementary Note 7]

The information reporting device according to any one of Supplementary Notes 1 to 6, wherein the compensation unit generates a packet in which the terminal is designated as a transmission source, and the communication state giving unit gives the communication state information to the packet generated by the compensation unit.

[Supplementary Note 8]

The information reporting device according to any one of Supplementary Notes 1 to 7, wherein the communication state giving means gives a plurality of pieces of communication state information related to a communication state between the terminal and the relay device to the packet transmitted by the terminal.

[Supplementary Note 9]

The information reporting device according to any one of Supplementary Notes 1 to 8, wherein the compensation unit gives the communication state information related to the terminal to a packet transmitted by a terminal other than the terminal.

[Supplementary Note 10]

The information reporting device according to Supplementary Note 9, further comprising:

priority calculation means for calculating, for each of a plurality of terminals, a priority for transmitting communication state information to the communication device, wherein the compensation means gives communication state information, which is related to a terminal selected from among the plurality of terminals in response to the priority, to the packet transmitted by a terminal other than a selected terminal.

[Supplementary Note 11]

An information reporting method by an information reporting device that transfers, to a communication device, a packet transmitted to a relay device by a terminal, the method comprising:

giving communication state information related to a communication state between the terminal and the relay device to a packet transmitted by the terminal;

transmitting, to the communication device, a packet given the communication state information; and implementing report compensation processing for reporting the communication state information to the communication device when a packet does not arrive from the terminal.

[Supplementary Note 12]

The information reporting method according to Supplementary Note 11, further comprising:

determining whether to implement the report compensation processing when the packet does not arrive from the terminal; and implementing the report compensation processing, based on a result of the determination.

[Supplementary Note 13]

The information reporting method according to Supplementary Note 12, further comprising determining whether to implement the report compensation processing, based on an elapsed time after the communication state information is transmitted.

[Supplementary Note 14]

The information reporting method according to Supplementary Note 12, further comprising determining whether to implement the report compensation processing, based on a difference between a communication state when the communication state information is transmitted and a communication state after transmission.

[Supplementary Note 15]

The information reporting method according to Supplementary Note 12, further comprising implementing the report compensation processing, based on a determination result as to whether to implement the report compensation processing, the determination result being received from the communication device.

[Supplementary Note 16]

The information reporting method according to any one of Supplementary Notes 11 to 15, further comprising instructing the relay device to cause the terminal to implement packet re-sending processing, as the report compensation processing.

[Supplementary Note 17]

The information reporting method according to any one of Supplementary Notes 11 to 16, further comprising:

generating a packet in which the terminal is designated as a transmission source; and giving the communication state information to a generated packet.

[Supplementary Note 18]

The information reporting method according to any one of Supplementary Notes 11 to 17, further comprising giving a plurality of pieces of communication state information related to a communication state between the terminal and the relay device to the packet transmitted by the terminal.

[Supplementary Note 19]

The information reporting method according to any one of Supplementary Notes 11 to 18, further comprising giving the communication state information related to the terminal to a packet transmitted by a terminal other than the terminal.

[Supplementary Note 20]

The information reporting method according to Supplementary Note 19, further comprising:

calculating a priority for transmitting communication state information to the communication device for each of a plurality of terminals; and giving communication state information related to a terminal selected from among the plurality of terminals in response to the priority to a packet transmitted by a terminal other than a selected terminal.

[Supplementary Note 21]

A recording medium that records a program causing a computer provided in an information reporting device that transfers, to a communication device, a packet transmitted to a relay device by a terminal, to execute:

processing of giving communication state information related to a communication state between the terminal and the relay device to a packet transmitted by the terminal;

processing of transmitting, to the communication device, a packet given the communication state information; and processing of implementing report compensation processing for reporting the communication state information to the communication device when a packet does not arrive from the terminal.

Note that the entire disclosed contents of PTLs 1 to 5 and NPL 1 are incorporated herein by reference. Within the scope of the entire disclosure (including the scope of claims) of the present invention, it is possible to further alter and adjust the example embodiments on the basis of the basic technical idea thereof. Moreover, it is possible to make diverse combinations and selections of a variety of disclosed elements (including respective elements of the respective claims, the respective elements of the respective example embodiments, the respective elements of the respective drawings, and the like) within the scope of the entire disclosure of the present invention. In other words, it is a matter of course that the present invention incorporates varieties of modifications and corrections which can be achieved by those skilled in the art in accordance with the entire disclosure and technical idea including the scope of claims. Particularly, with regard to the numeric range described in this description, it shall be interpreted that arbitrary numeric values and small ranges, which are included in the range, are specifically described unless otherwise stated.

REFERENCE SIGNS LIST 10, 10a to 10c Terminal
20 Base station
21 Router
30, 50 Information reporting device
31 Data transfer unit
32 Communication state acquisition unit
33 Communication state giving unit
34 Necessity determination unit
35, 36 Compensation unit
37 Priority calculation unit
40 Communication device
60 Information processing device
61 CPU
62 Memory

The invention claimed is:

1. An information reporting device configured to transfer, to a communication device, a packet transmitted to a relay device by a terminal, the information reporting device comprising:

a communication state giving unit configured to give communication state information related to a communication state between the terminal and the relay device to a packet transmitted by the terminal;

a data transfer unit configured to transmit, to the communication device, a packet given the communication state information;

a compensation unit configured to implement report compensation processing for reporting the communication state information to the communication device if a packet does not arrive from the terminal; and a necessity determination unit configured to determine whether to implement the report compensation processing if the packet does not arrive from the terminal;

wherein the compensation unit is configured to implement the report compensation processing using a result of the determination, and wherein the necessity determination unit is configured to determine whether to implement the report compensation processing using an elapsed time after the communication state giving unit transmits the communication state information, the elapsed time being shorter than a t-Reordering timer.

2. The information reporting device according to claim 1, wherein the necessity determination unit is configured to determine whether to implement the report compensation processing, using a difference between a communication state if the communication state giving unit transmits the communication state information and a communication state after transmission.

3. The information reporting device according to claim 1, wherein the compensation unit is configured to implement the report compensation processing, using a determination result as to whether to implement the report compensation processing, the determination result being received from the communication device.

4. The information reporting device according to claim 1, wherein the compensation unit is configured to instruct the relay device to cause the terminal to implement packet re-sending processing, as the report compensation processing.

5. The information reporting device according to claim 1, wherein the compensation unit is configured to generate a packet in which the terminal is designated as a transmission source, and wherein the communication state giving unit is configured to give the communication state information to the packet generated by the compensation unit.

6. The information reporting device according to claim 1, wherein the communication state giving unit is configured to give a plurality of pieces of communication state information related to a communication state between the terminal and the relay device to the packet transmitted by the terminal.

7. The information reporting device according to claim 1, wherein the compensation unit is configured to give the communication state information related to the terminal to a packet transmitted by a terminal other than the terminal.

8. The information reporting device according to claim 7, further comprising:

a priority calculation unit configured to calculate, for each of a plurality of terminals, a priority for transmitting communication state information to the communication device, wherein the compensation unit is configured to give communication state information, which is related to a terminal selected from among the plurality of terminals in response to the priority, to the packet transmitted by a terminal other than a selected terminal.

9. An information reporting method by an information reporting device that transfers, to a communication device, a packet transmitted to a relay device by a terminal, the method comprising:

giving communication state information related to a communication state between the terminal and the relay device to a packet transmitted by the terminal;

transmitting, to the communication device, a packet given the communication state information;

implementing report compensation processing for reporting the communication state information to the communication device if a packet does not arrive from the terminal; and determining whether to implement the report compensation processing if the packet does not arrive from the terminal;

wherein the implementing implements the report compensation processing using a result of the determination, and wherein the determining determines whether to implement the report compensation processing using on an elapsed time after transmission of the communication state information, the elapsed time being shorter than a t-Reordering timer.

10. A non-transitory recording medium that records a program that if executed, causes a computer provided in an information reporting device that transfers, to a communication device, a packet transmitted to a relay device by a terminal, to execute processing comprising:

processing of giving communication state information related to a communication state between the terminal and the relay device to a packet transmitted by the terminal;

processing of transmitting, to the communication device, a packet given the communication state information;

processing of implementing report compensation processing for reporting the communication state information to the communication device if a packet does not arrive from the terminal; and processing of determining whether to implement the report compensation processing if the packet does not arrive from the terminal;

wherein the processing of implementing implements the report compensation processing using a result of the determination, and wherein the processing of determining determines whether to implement the report compensation processing using an elapsed time after transmission of the communication state information, the elapsed time being shorter than a t-Reordering timer.

* * * * *